Patented Aug. 3, 1926.

1,594,810

UNITED STATES PATENT OFFICE.

RAYMOND C. BENNER, OF BAYSIDE, NEW YORK, AND HARRY H. THOMPSON, OF CLEVELAND, OHIO, ASSIGNORS TO NATIONAL CARBON COMPANY, INC., A CORPORATION OF NEW YORK.

THERMOPLASTIC COMPOSITION.

No Drawing. Application filed July 2, 1923. Serial No. 649,154.

This invention relates to improvements in thermoplastic coating compositions, especially adapted for use in the manufacture of dry cells or dry cell batteries. A principal object of the invention is the provision of a thermoplastic composition giving improved results when used in forming coated metal electrodes, of a type to be described.

Composite electrodes consisting of a metal plate coated on at least one surface with a non-corrodible, conducting composition electronegative to the metal, are especially desirable in the construction of flat dry cell batteries. In such batteries the composite electrode may serve as anode, cathode, and electrical connection between adjacent cells. This effects a marked simplification in construction and economizes space. In addition, the integral construction of the electrode results in a low battery resistance. The coated electrodes are also capable of advantageous use in galvanic cells of other kinds, as well as for other electrolytic purposes. The coating composition used should possess in addition to the properties above mentioned, ability to adhere very tenaciously to the metallic portion of the electrode.

We have discovered that thermoplastic compositions comprising a resin, linseed oil, graphite, and a paraffin wax such as scale wax are excellently adapted for the purpose indicated. A preferred composition is given by way of example, the parts being by weight:

| | Parts. |
|---|---|
| Rosin | 30-40 |
| Linseed oil | 5-7 |
| Scale wax | 8-10 |
| Graphite (through 130 mesh screen) | 150 |
| Graphite (through 100 mesh screen) | 35 |

The rosin, linseed oil, and wax are heated together, and thoroughly mixed with the graphite. The hot mixture is spread on the metal to be coated, and the coated metal may then be passed between hot iron smoothing rolls. The electrodes are trimmed to remove exuded plastic and allowed to harden. Other suitable coating processes may be used.

While drying oils are generally to be preferred, good results may be obtained with oils of other kinds, for example engine oil. Other natural resins of the type of rosin may be used, as well as certain synthetic resins, such as coumaron resin. By varying the proportion of oil to resin, the plasticity or viscosity of the composition may be varied to any desired degree.

Scale wax may be substituted for a part of the linseed oil, and vice versa, within rather wide limits, and various other changes in the specific mixture may be made while retaining its essential advantages. A small amount of lime, one or two per cent, for example, may be added. The coating produced is impermeable by electrolyte and has good conductivity. It adheres very tenaciously to the zinc or other metal forming the base of the electrode.

In an application Serial No. 534,509, filed February 6, 1922, by R. C. Benner, coatings of this type are disclosed, and cell constructions comprising composite electrodes are described and claimed. Numerous other uses of the improved composition will be evident to those skilled in the art.

We claim:

1. A conductive thermoplastic composition adapted for use in the preparation of electrodes and comprising a resin, oil, scale wax, and graphite.

2. A conductive thermoplastic composition adapted for use in the preparation of electrodes and comprising rosin, linseed oil, scale wax, and graphite.

3. A composition adapted to be used in coating metal to form composite electrodes, and comprising about 30 parts by weight of rosin, about 5 parts linseed oil, about 8 parts scale wax, and about 185 parts graphite.

In testimony whereof, we affix our signatures.

HARRY H. THOMPSON.
RAYMOND C. BENNER.